Patented Aug. 25, 1931

1,820,039

UNITED STATES PATENT OFFICE

ARTHUR ZITSCHER, OF OFFENBACH-ON-THE-MAIN, AND ROBERT SCHMITT, OF DARMSTADT, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND PROCESS OF MAKING SAME

No Drawing. Application filed April 3, 1929, Serial No. 352,318, and in Germany April 7, 1928.

The present invention relates to azodyestuffs insoluble in water and to a process of preparing the same.

We have found that valuable azodyestuffs insoluble in water are obtained by combining any diazo-, tetrazo- or diazo-azo-compound not containing sulfonic or carboxylic groups with a dihydroxy quinoline compound of the probable general formula:

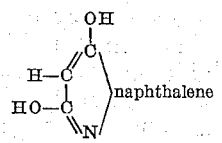

The dihydroxy quinoline compounds used in our process may be prepared for instance in an analogous manner as described in Berichte der Deutschen Chemischen Gesellschaft, vol. 60, page 832 or 1108, or in Camp's Archiv der Pharmazie, vol. 237, page 659.

Whereas 2.4-dihydroxy quinoline itself yields useless dyeings when employed for the manufacture of ice-colors, according to our process valuable pigment dyestuffs are obtained by means of the usual substrata, or fast dyeings and printings on the fiber by producing the dyestuffs according to the ice-color method. In consequence of the substantive properties of these combining components the goods padded therewith may be developed without being previously dried.

In order to further illustrate our invention the following examples are given, the parts being by weight and all temperatures in centigrade degrees, but it may be understood that our invention is not limited to the particular products or conditions of reaction mentioned therein.

Example 1

Cotton yarn well boiled and dried is padded with a solution containing per liter 10 grs. of 7.8-benzo-2.4-dihydroxy-quinoline of the probable formula:

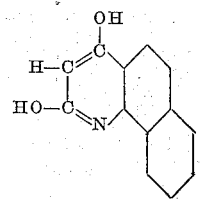

(prepared from 1-naphthylamine and malonic ester in an analogous manner as described in Berichte der Deutschen Chemischen Gesellschaft, vol. 60, page 832), 15 ccm. of a caustic soda solution of 34° Bé., 10 ccm. of Turkey red oil and 28 grs. of Glauber's salt. Then it is well wrung out and developed with a diazo solution partially neutralized with sodium acetate and containing per liter 1.62 grs. of 2.5-dichloro aniline. Thereafter it is rinsed, soaped and dried.

In this manner a brownish-orange dyeing of a very good fastness is obtained.

The following table shows the shades of dyeings prepared in like manner from the same padding solution and from the diazo compounds of the following bases:

| Base | Shade |
|---|---|
| 1-amino-anthraquinone | Brownish yellow-orange. |
| o-amino-azo-toluene | Yellowish-red. |

Example 2

Cotton yarn previously treated in a suitable manner is padded with a solution containing per liter 10 grs. of 5.6-benzo-2.4-dihydroxy-quinoline of the probable formula:

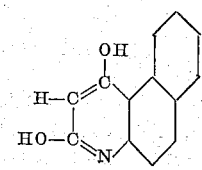

(light yellowish needles melting above 345°, prepared from 2-naphthylamine and malonic ester in an analogous manner as described in Berichte der Deutschen Chemischen Gesellschaft, vol. 60, page 832), 15 ccm. of a caustic soda solution of 34° Bé., 10 ccm. of Turkey red oil and 28 grs. of Glauber's salt. Then it is well wrung out and developed with a diazo solution partially neutralized with sodium acetate and containing per liter 1.62 grs. of 2.5-dichloro aniline. Thereafter it is rinsed, soaped and dried.

In this manner an orange-yellow dyeing of a very good fastness is obtained.

The following table shows the shade of dyeings prepared in like manner from the same padding solution and from the diazo compounds of the following bases:

| Base | Shade |
|---|---|
| 5-nitro-2-amino-toluene | Reddish-orange. |
| 1-amino-anthraquinone | Yellowish-orange. |

*Example 3*

Cotton yarn previously treated in a suitable manner is padded with a solution containing per liter 10 grs. of 6.7-benzo-2.4-dihydroxy-quinoline of the probable formula:

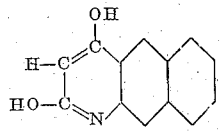

(yellowish needles melting above 355°, prepared for instance from 2-amino-3-naphthoic acid ethylester and malonic ester in an analogous manner as described in Berichte der Deutschen Chemischen Gesellschaft, vol. 60, page 1108), 15 ccm. of a caustic soda solution of 34° Bé., 10 ccm. of Turkey red oil and 28 grs. of Glauber's salt. Then it is well wrung out and developed with a diazo solution partially neutralized with sodium acetate and containing per liter 1.62 grs. of 2.5-dichloroaniline. Thereafter it is rinsed, soaped and dried.

In this manner an orange-yellow dyeing of a very good fastness is obtained.

The following table shows the shades of dyeings prepared in like manner from the same padding solution and from the diazo-compounds of the following bases:

| Base | Shade |
|---|---|
| 2-amino-diphenylether | Yellowish-orange |
| 5-nitro-2-amino-toluene | Brownish-orange |
| 1-amino-anthraquinone | Brownish-orange |
| o-amino-azo-toluene | Yellowish-red |

We wish it to be understood that in the following claims the term "combining" means everywhere combining in substance or on a substratum especially on the vegetable fiber and that the term "diazotized compound" comprises diazo- as well as tetrazo- and diazoazo-compounds.

We claim:

1. A process which comprises combining a diazotized compound not containing sulfonic or carboxylic groups with a dihydroxy-quinoline compound of the probable general formula:

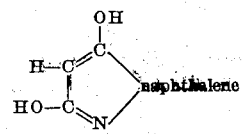

2. A process which comprises combining a diazotized compound not containing sulfonic or carboxylic groups with 6.7-benzo-2.4-dihydroxy-quinoline of the probable formula:

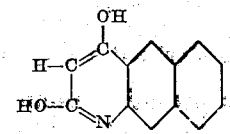

3. As new compounds the azodyestuffs of the probable general formula:

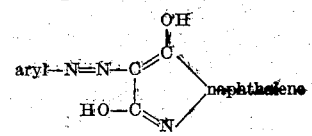

wherein the arylgroup may contain further azo-groups, which compounds are colored powders, insoluble in water yielding valuable color lakes or when produced on the fiber fast dyeings and printings.

4. As new compounds the azodyestuffs of the probable general formula:

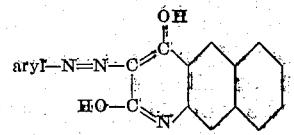

wherein the arylgroup may contain further azo-groups, which compounds are colored powders, insoluble in water yielding valuable color lakes or when produced on the fiber fast dyeings and printings.

In testimony whereof, I affix my signature.
ARTHUR ZITSCHER.

In testimony whereof, I affix my signature.
ROBERT SCHMITT.